(12) United States Patent
Guan

(10) Patent No.: US 12,433,300 B2
(45) Date of Patent: Oct. 7, 2025

(54) MULTIFUNCTIONAL ELECTRIC SMOKE CURING DEVICE

(71) Applicant: ZHENGZHOU JINMOREN HOME FURNISHING CO., LTD., Zhengzhou (CN)

(72) Inventor: Dongdong Guan, Zhengzhou (CN)

( * ) Notice: Subject to any disclaimer, the term of this patent is extended or adjusted under 35 U.S.C. 154(b) by 864 days.

(21) Appl. No.: 17/703,907

(22) Filed: Mar. 24, 2022

(65) Prior Publication Data

US 2023/0301315 A1    Sep. 28, 2023

(51) Int. Cl.
  *A23B 4/052*    (2006.01)
  *A23B 4/044*    (2006.01)

(52) U.S. Cl.
  CPC .............. *A23B 4/052* (2013.01); *A23B 4/044* (2013.01)

(58) Field of Classification Search
  CPC ................................ A23B 4/052; A23B 4/044
  USPC .......................................................... 99/482
  See application file for complete search history.

(56) References Cited

U.S. PATENT DOCUMENTS

| | | | | |
|---|---|---|---|---|
| 4,164,230 | A * | 8/1979 | Pearlman | A24F 1/22 131/330 |
| 4,436,100 | A * | 3/1984 | Green, Jr. | F23B 20/00 110/118 |
| 11,877,581 | B2 * | 1/2024 | Upston | A23B 4/052 |
| 2020/0214304 | A1 * | 7/2020 | Garces | A23B 4/052 |
| 2023/0009151 | A1 * | 1/2023 | Deng | A23B 4/052 |

* cited by examiner

*Primary Examiner* — Reginald Alexander

(57) ABSTRACT

A multifunctional electric smoke curing device includes a smoke curing device main body and a burning seat. A bottom of the burning seat is provided with a second smoke discharging port, the smoke curing device main body is provided with a mounting channel and a smoke discharging channel. The mounting channel forms an upper mounting opening and a lower mounting. The burning seat is detachably arranged in the mounting channel through the upper mounting opening or the lower mounting opening to cause the second smoke discharging port to be communicated with the smoke discharging channel. The smoke discharging channel forms a first smoke discharging port on the bottom end surface of the smoke curing device main body. A pumping device is arranged in the smoke discharging device to pump out smoke produced by the burning seat via the first smoke discharging port.

16 Claims, 9 Drawing Sheets

MULTIFUNCTIONAL ELECTRIC SMOKE CURING DEVICE

FIELD OF THE INVENTION

The present disclosure relates to the technical field of food processing, in particular to a multifunctional electric smoke curing device.

BACKGROUND OF THE INVENTION

Smoke curing is to use smoke produced when fuel is not completely burnt to perform smoke curing on food. Smoke curing changes the taste of the food, improves the quality and prolongs the shelf life. It is a food processing method and also a seasoning process of food. As a food processing and preservation method, smoke curing has been used since the ancient times. In the past, the original purpose of smoke curing was to prolong the preservation period. However, with the development of modern freezing preservation technology, these processing methods have become a kind of processing method for producing products with special flavor. Prolonging the preservation period becomes a secondary purpose.

At present, a smoking curing technology is widely used in molecular cooking, that is, smoke is produced by burning smoke curing wood such as "hickory, mesquite, applewood, and cherry". The produced smoke and food coexist in a small transparent closed space for smoke curing to endow the food with different unique flavors. At the same time, the misty smoke gives people a sense of beauty. The fragrance of the smoke when a lid is opened makes people feel pleasant, thus greatly improving the quality of people's meals.

When making smoked molecular delicacies, a smoke curing device is needed. At present, smoke curing devices on the market are mostly divided into "wooden cover" smoke curing devices and "mechanical" smoke curing devices. The "wooden cover" smoke curing device is usually used for the smoking curing of beverage. During use, the beverage is placed in a cup; the "wooden cover" smoke curing device is covered at a cup opening; a closed space is formed between a bottom surface of the cover body and the cup opening; wood chips are put into the cover; the wood chips are ignited by a flame igniter to produce smoke; the smoke is discharged into the cup through a smoke outlet in the bottom of the cover under the flame momentum of the flame igniter, so as to achieve the smoke curing of the beverage. However, this device has many inconveniences in use. For example, the smoke enters the cup through a thrust of the flame igniter. This method will cause a large amount of smoke to escape into air, but only a small part of the smoke can enter the cup. The method is suitable for the smoke curing of beverage, but is not applicable to the smoke curing of other foods, that is, the equipment has the technical problem of "low efficiency of smoke curing of beverage and inconvenience in smoke curing of other non-beverage foods".

Most of the "mechanical" smoke curing devices are smoke curing guns, which are usually used with a smoke guide hose. There is a pumping device inside. The smoke produced by the burning of the wood chips is discharged via the hose under the action of the pumping device. When the device is used, a food needs to be placed in a plate and is covered with a transparent cover; the smoke curing gun is then turned on to convey the smoke into the cover, so as to achieve the smoke curing of the food. However, this device is still inconvenient in use. For example, when beverage is subjected to smoke curing, especially when the beverage is put into an open bottle, it is difficult to keep the smoke in the open bottle, and the effect is not as good as that of the "wood cover" smoke curing device, that is, the equipment has the technical problem of "poor effect of smoke curing of the beverage and inconvenience in use".

To sum up, the smoke curing device on the market, whether it is the "wooden cover" smoke curing device or the "mechanical" smoke curing device, has certain defects during use and has the technical problem that "it is difficult to conveniently and effectively perform smoke curing on beverage food and non-beverage food". Therefore, when purchasing, people often need to purchase two kinds of smoke curing devices at the same time, which increases the consumption cost.

SUMMARY OF THE INVENTION

In order to overcome the disadvantage of the existing smoke curing device, the present disclosure provides a multifunctional electric smoke curing device.

The present disclosure adopts the following technical solution: a c including a smoke curing device main body and a burning seat, wherein the burning seat is used for burning a combustible to produce smoke; a bottom of the burning seat is provided with a mounting part, and the mounting part has a second smoke discharging port; the smoke curing device main body is provided with a mounting channel and a smoke discharging channel; the mounting channel forms an upper mounting opening and a lower mounting opening on a top end surface and a bottom end surface of the smoke curing device main body, respectively; the mounting part is detachably arranged in the mounting channel through the upper mounting opening or the lower mounting opening to cause the second smoke discharging port to be communicated with the smoke discharging channel; the smoke discharging channel forms a first smoke discharging port on the bottom end surface of the smoke curing device main body; a pumping device is arranged in the smoke discharging device to pump out smoke produced by the burning seat via the first smoke discharging port.

Further, the mounting channel penetrates through the smoke curing device main body up and down, so as to form the upper mounting opening and the lower mounting opening on the top end surface and the bottom end surface of the smoke curing device main body, respectively.

Further, the mounting part is internally hollowed; the second smoke discharging port is arranged in the periphery of a side wall of the mounting part; the burning seat further includes a burning part; the burning part is arranged above the mounting part and is communicated with the mounting part; the burning part is used for accommodating the combustible.

Further, the second smoke discharging port is a square elongated slot.

Further, the burning seat further includes a filter net; the filter net is arranged in the burning part.

Further, wherein several air inlet holes are formed in a side wall of the burning part.

Further, the mounting part and the mounting channel are both cylindrical; a diameter length of the mounting part is less than an inner diameter length of the mounting channel.

Further, a bottom of the mounting part is provided with a protruding part surrounding one circle of the mounting part and extends outwards; a diameter length of the protruding part is matched with the inner diameter length of the mounting channel, so that an outer side wall of the protruding part is clung to an inner side wall of the mounting channel.

Further, the burning part is of a bowl shape having a large upper part and a small lower part; a diameter length of the bottom of the burning part is greater than the inner diameter length of the mounting channel; the mounting part is inserted into the mounting channel until the bottom of the burning part resists against the bottom end surface or the top end surface of the smoke curing device main body.

Further, an opening in one end of the smoke discharging channel is formed in a side wall of the mounting channel, and an opening in the other end of the smoke discharging channel is formed in the bottom end surface of the smoke curing device main body to form the first smoke discharging port; when the mounting part is inserted into the mounting channel, a passageway for discharging smoke is formed among the second smoke discharging port, the smoke discharging channel, and the first smoke discharging port.

Further, when the mounting part is inserted into the mounting channel, the position of the second smoke discharging port corresponds to the position where the smoke discharging channel is communicated to the opening in one end of the mounting channel.

Further, the pumping device includes a driving device and an exhaust fan; the exhaust fan is arranged in the smoke discharging channel; the driving device is arranged outside the smoke discharging channel.

Further, the exhaust fan is provided with an insertion hole; a rotating hole is formed in a side wall, opposite to the insertion hole, of the smoke discharging channel; a rotating end of the driving device penetrates into the rotating hole and is connected to the insertion hole.

Further, the smoke discharging channel includes a left channel and a right channel; the left channel and the right channel are both cylindrical; an inner diameter length of the left channel is less than that of the right channel; a left opening of the left channel is communicated to the mounting channel; a right opening of the left channel is communicated to a left opening of the right channel; the right channel is provided with an opening in a lower side wall, and the opening is communicated to the first smoke discharging port; the exhaust fan is arranged in the right channel; the insertion hole is opposite to a right side wall of the right channel.

Further, a sealing member is arranged at the rotating hole.

Further, a charging power supply and a control circuit board are arranged in the smoke curing device main body; a power button and a charging insertion slot are arranged on the smoke curing device main body; the power button and the charging insertion slot are electrically connected to the control circuit board, respectively; the charging power supply is electrically connected to the control circuit board and the driving device.

Further, the multifunctional electric smoke curing device further including a smoke guide hose sleeved at the first smoke discharging port.

The present disclosure has the beneficial effects:

According to the multifunctional electric smoke curing device provided by the present disclosure, since the first smoke discharging port is arranged in the bottom of the smoke curing device main body; the mounting channel includes the upper mounting opening and the lower mounting opening; the upper mounting opening and the lower mounting opening are respectively formed in the top end surface and the bottom end surface of the smoke curing device main body; during use, the burning seat can be mounted on the front and back surfaces of the smoke curing device main body, respectively.

During beverage needs to be subjected to smoke curing, the burning seat can be mounted on the top surface of the smoke curing device main body, that is, the mounting part is inserted into the upper mounting opening. During use, the bottom surface of the multifunctional electric smoke curing device of the present disclosure is fastened at the cup opening, so that the first smoke discharging port is arranged in the cup; therefore, the cup opening and the bottom of the smoke curing device main body form a closed space; the pumping device is turned on; smoke curing wood are ignited; the smoke enters the cup from the first smoke discharging port under the action of the pumping device, so as to achieve smoke curing of the beverage. The device is convenient to use and operate. The multifunctional electric smoke curing device of the present disclosure is provided with the pumping device, so that the smoke enters the cup under the action of the pumping device, thus overcoming the shortcoming that a conventional "wood cover" smoke curing device brings the smoke into the cup by the momentum of a flame igniter and causes a large amount of smoke to escape to air. The smoke conversion efficiency is high, and consumption of the smoke curing wood is reduced.

When non-beverage needs to be subjected to smoke curing, the bottom of the multifunctional electric smoke curing device is upward, and the top is downward, so that the multifunctional electric smoke curing device is used upside down to enable the first smoke discharging port to be upward; the burning seat is then mounted on the back surface of the smoke curing device main body, that is, the mounting part is inserted into the lower mounting opening. During use, the smoke guide hose is connected to the first smoke discharging port; the pumping device is turned on to ignite the smoke curing wood; the smoke is discharged by the smoke guide hose under the action of the pumping device to perform smoke curing on the non-beverage, thus achieving functions of a conventional "mechanical" smoke curing device. The device is convenient to use.

In conclusion, the multifunctional electric smoke curing device of the present disclosure has "two functions", which can conveniently perform smoke curing on non-beverage food and effectively perform smoke curing on beverage; the technical problem that "smoke curing can be conveniently performed on beverage food and effectively performed on non-beverage food through the same smoke curing device" is solved; the consumption cost of a user is reduced; the operations are simplified; during the smoke curing of the beverage, the smoke enters the cup via the pumping device, which prevents a large amount of smoke from escaping into the air, enhances the smoke curing effect, and reduces the consumption of the smoke curing wood.

BRIEF DESCRIPTION OF THE DRAWINGS

For the purpose of a clearer description of the embodiments in this application or technical solutions in prior art, below is a brief introduction of the attached drawings needed to be used in the description of the embodiments or prior art. Apparently, the attached drawings in the following description are only some embodiments indicated in the present application. For ordinary skill in the art, they may obtain other drawings according to these attached drawings without any innovative laboring.

The present disclosure will be further described with reference to the attached drawings and the embodiments hereunder.

DETAILED DESCRIPTION OF THE ILLUSTRATED EMBODIMENT

Figure 1:
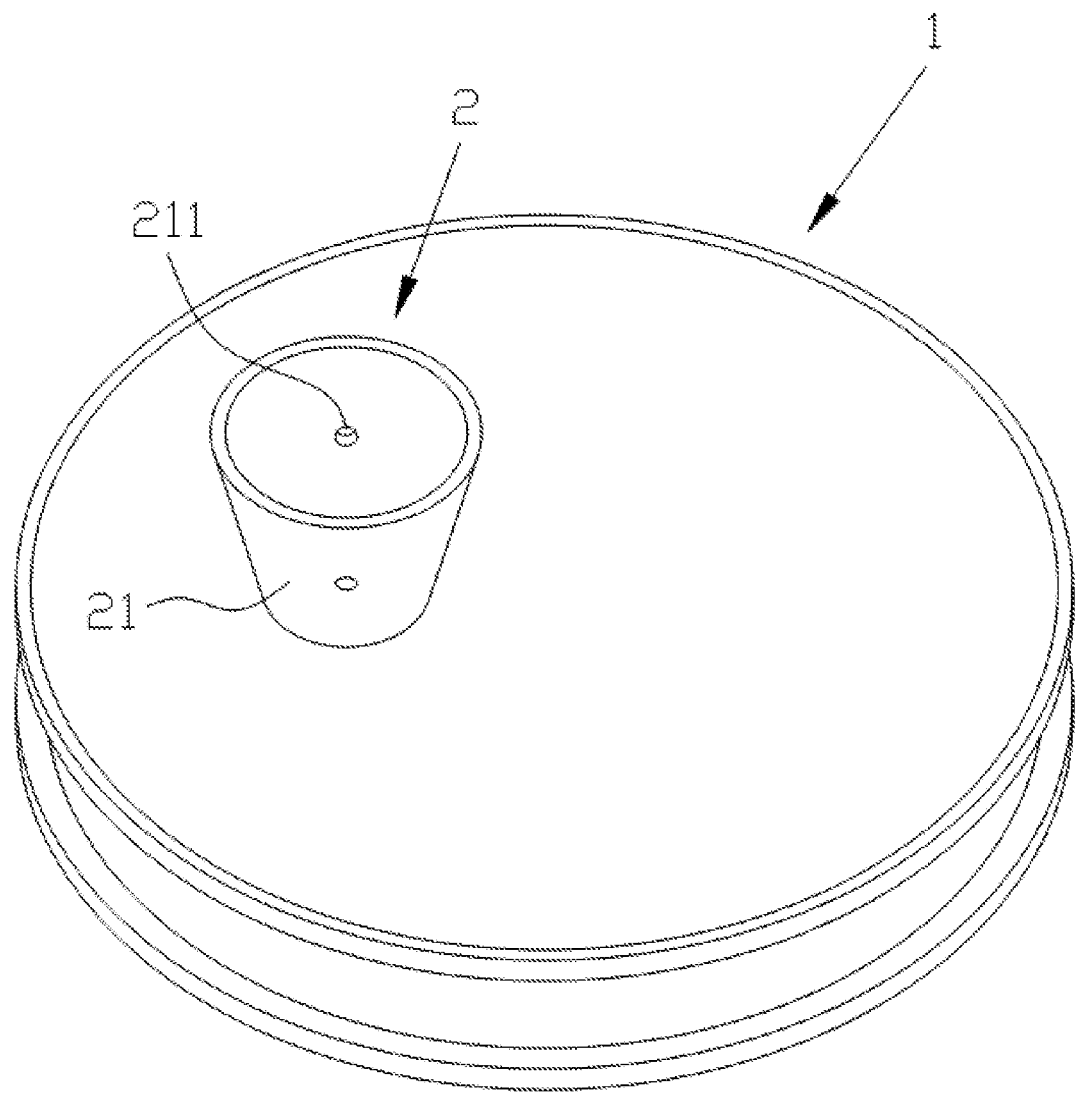
FIG. 1 illustrates a (top) oblique diagram of a multifunctional electric smoke curing device in which a burning seat is mounted at an upper mounting opening.
Figure 2:
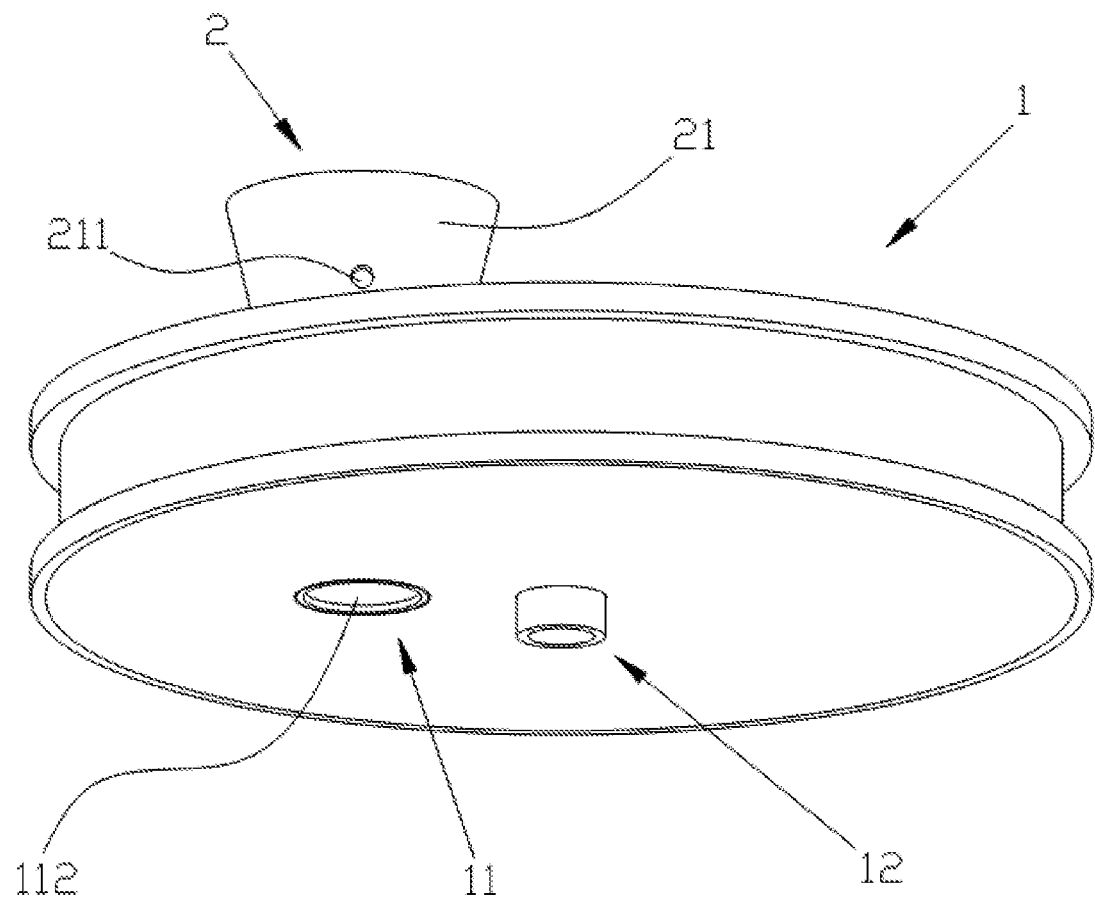
FIG. 2 illustrates a (bottom) oblique diagram of a multifunctional electric smoke curing device in which a burning seat is mounted at an upper mounting opening.
Figure 3:
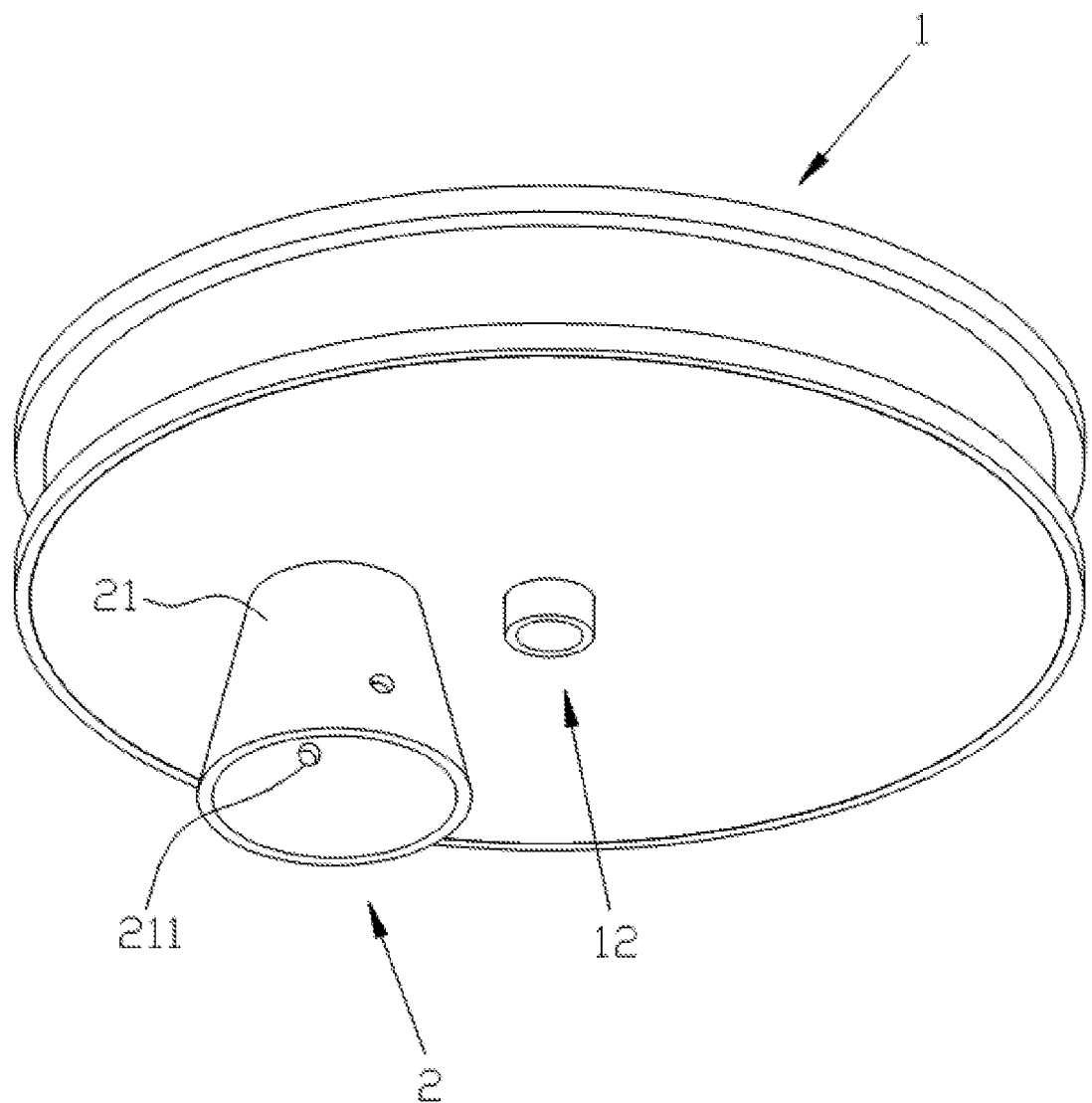
FIG. 3 illustrates a (bottom) oblique diagram of a multifunctional electric smoke curing device in which a burning seat is mounted at a lower mounting opening.
Figure 4:
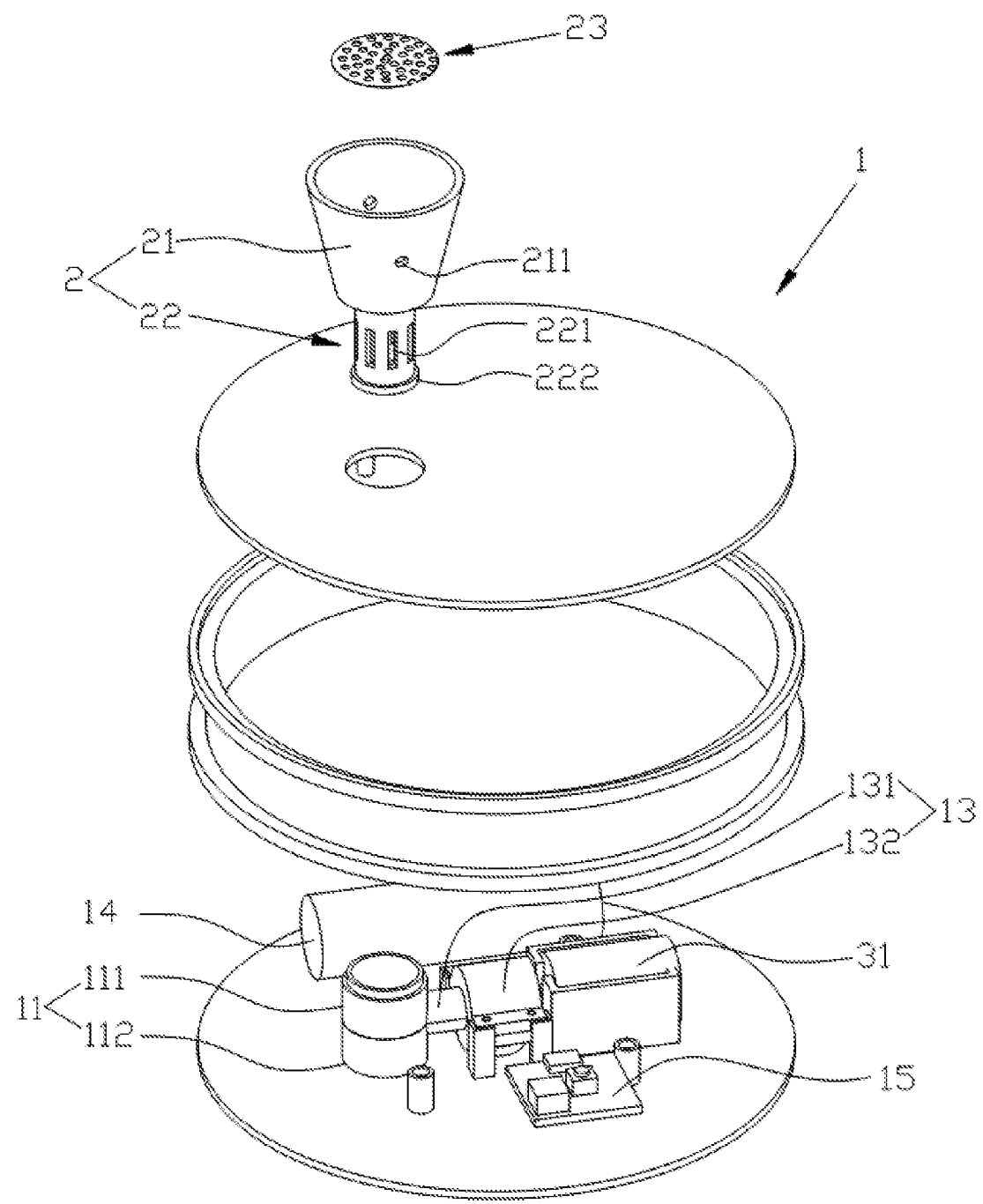
FIG. 4 illustrates an exploded diagram of a multifunctional electric smoke curing device.
Figure 5:
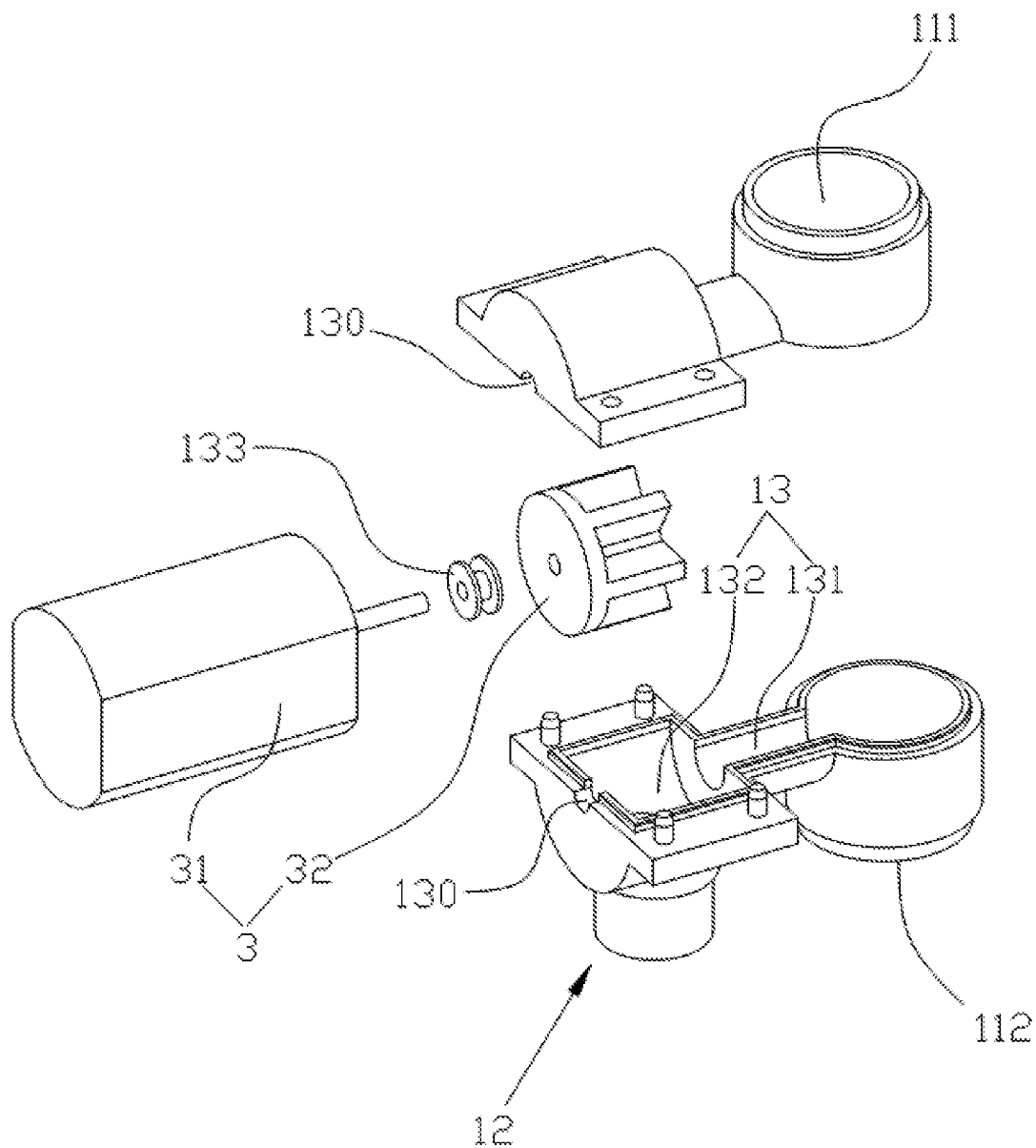
FIG. 5 illustrates an exploded diagram of a pumping device, a smoke discharging channel, a mounting channel, and a first smoke discharging port.
Figure 6:
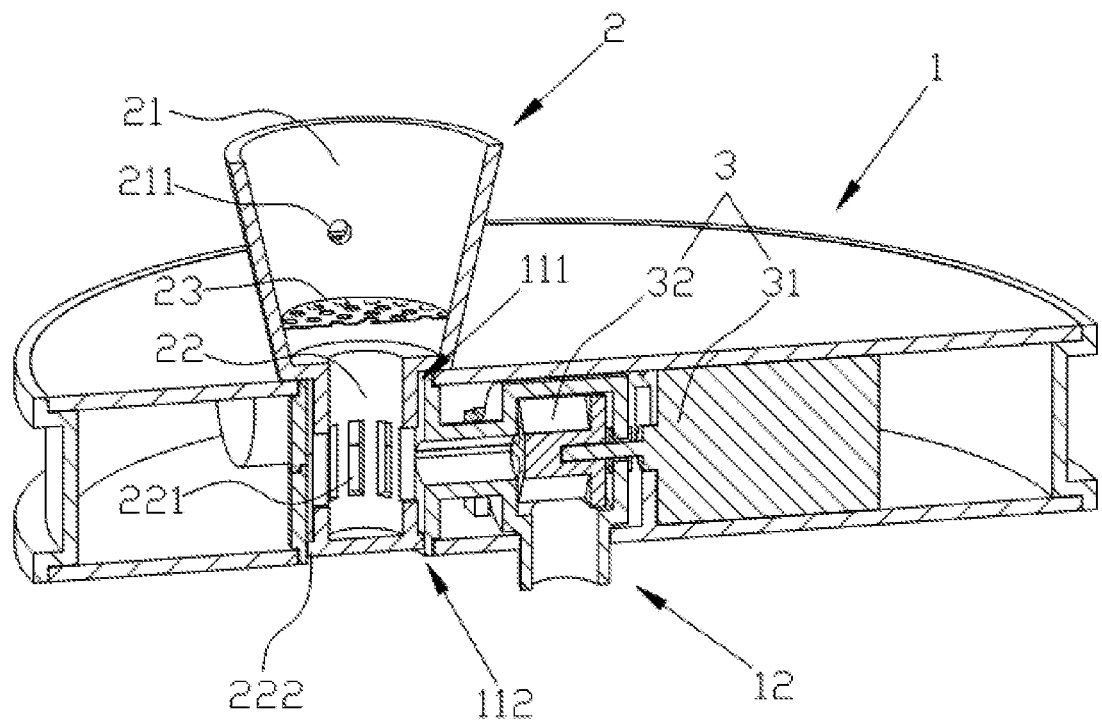
FIG. 6 illustrates sectional view of a multifunctional electric smoke curing device in which a burning seat is mounted at an upper mounting opening.
Figure 7:
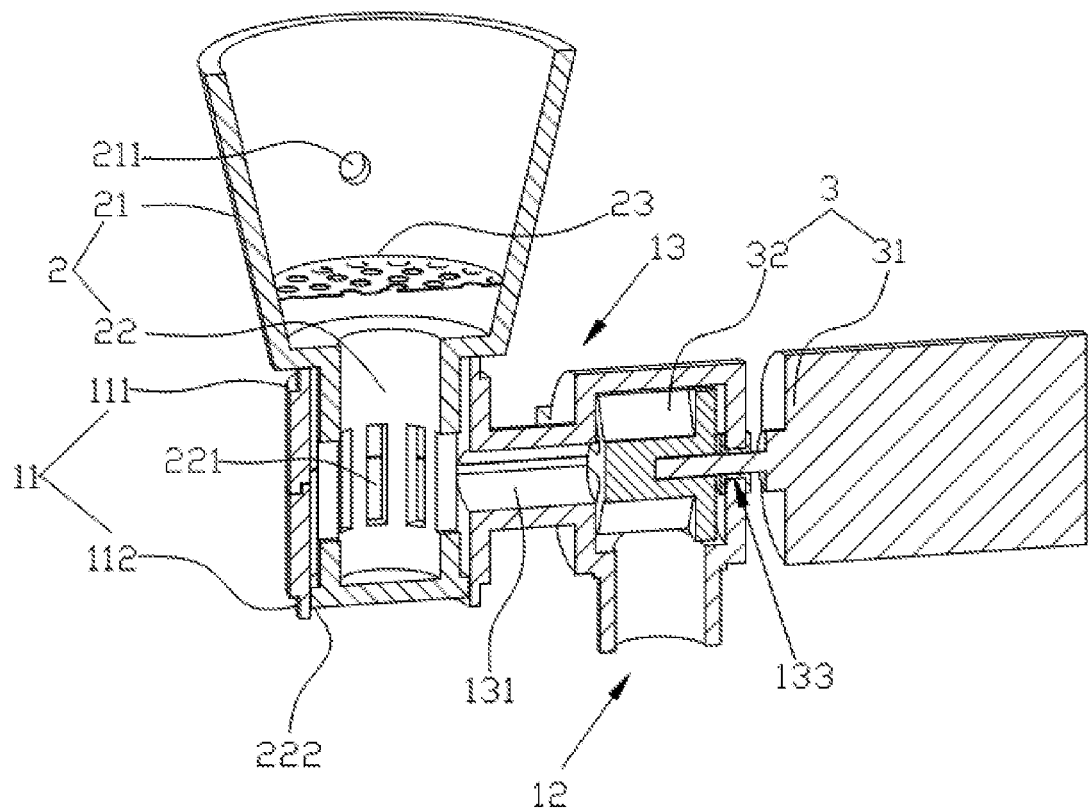
FIG. 7 illustrates a sectional view after a burning seat, a mounting channel, a smoke discharging channel, a first smoke discharging port, and a pumping device are connected.

In order to provide a clear understanding of the objects, features, and advantages of the embodiments, the following are detailed and complete descriptions to the technological solutions adopted in the embodiments. Obviously, the descriptions are part of the whole embodiments. The other embodiments which are not processed creatively by technicians of ordinary skills in the field are under the protection of this disclosure. The same is given with reference to the drawings and specific embodiments. It should be noted that non-conflicting embodiments in the disclosure and the features in the embodiments may be combined with each other without conflict.

In the following description, numerous specific details are set forth in order to provide a full understanding of the disclosure. The disclosure may be practiced otherwise than as described herein. The following specific embodiments are not to limit the scope of the disclosure.

Unless defined otherwise, all technical and scientific terms herein have the same meaning as used in the field of the art as generally understood. The terms used in the disclosure are to describe particular embodiments and are not intended to limit the disclosure.

The disclosure, referencing the accompanying drawings, is illustrated by way of examples and not by way of limitation. It should be noted that references to "an" or "one" embodiment in this disclosure are not necessarily to the same embodiment, and such references mean "at least one."

As shown in FIGS. 1-7, a multifunctional electric smoke curing device includes a smoke curing device main body 1 and a burning seat 2. The burning seat 2 is used for burning a combustible to produce smoke; a bottom of the burning seat 2 is provided with a mounting part 22, and the mounting part 22 has a second smoke discharging port 221; the smoke curing device main body 1 is provided with a mounting channel 11 and a smoke discharging channel 13; the mounting channel 11 forms an upper mounting opening 111 on a top end surface of the smoke curing device main body 1 and a lower mounting opening 112 on a bottom end surface of the smoke curing device main body 1; the mounting part 22 is detachably arranged in the mounting channel 11 through the upper mounting opening 111 or the lower mounting opening 112 to cause the second smoke discharging port 221 to be communicated with the smoke discharging channel 13; the smoke discharging channel 13 forms a first smoke discharging port 12 on the bottom end surface of the smoke curing device main body 1; a pumping device 3 is arranged in the smoke discharging device 13 to pump out smoke produced in the burning seat via the first smoke discharging port 12.

Specifically, the mounting channel 11 penetrates through the smoke curing device main body 1 up and down, so as to form the upper mounting opening 111 and the lower mounting opening 112; the mounting part 22 is internally hollowed; the second smoke discharging port 221 is arranged in the periphery of a side wall of the mounting part 22; the burning seat 2 further includes a burning part 21; the burning part 21 is arranged above the mounting part 22 and is communicated with the mounting part 22; the burning part 21 is used for accommodating the combustible.

The burning seat 2 is overall made of metal. Preferably, the burning seat 2 is made of aluminum alloy.

The multifunctional electric smoke curing device of the present disclosure further includes a smoke guide hose sleeved on the first smoke discharging port 12.

Figure 8:
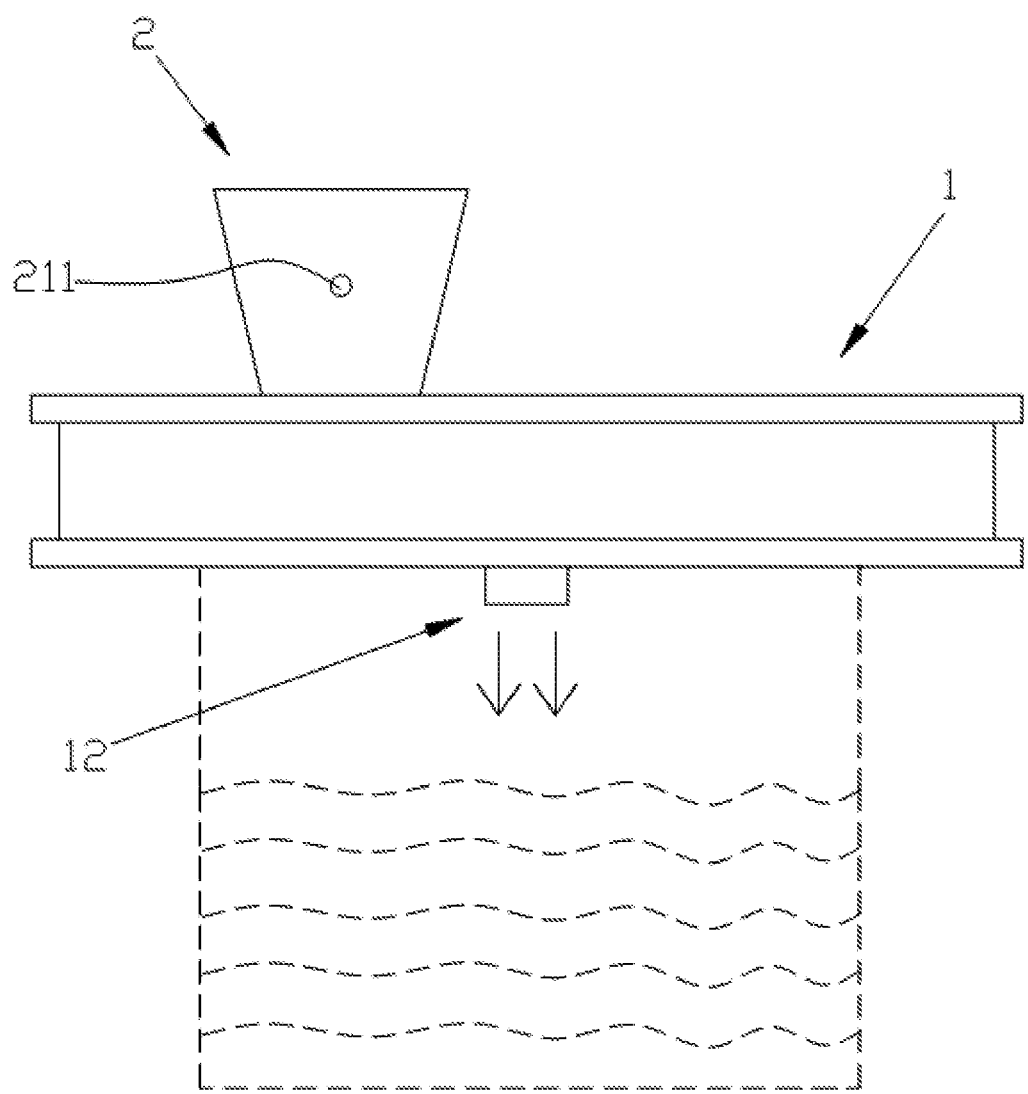
FIG. 8 illustrates a use state diagram when the present disclosure performs smoke curing on beverage (the arrow in the drawing is a smoke direction)

During smoke curing of beverage, as shown in FIG. 8, the beverage is placed in an open cup; the mounting part 22 is inserted into the upper mounting opening 111, so as to mount the burning seat 21 on a front surface of the smoke curing device main body 1; at this time, an opening of the burning part 21 is upward, and the first smoke discharging port 12 is downward; during use, the bottom of the smoke curing device main body 1 is fastened at a cup opening, so that the first smoke discharging port 12 is arranged in the cup; therefore, the cup opening and the bottom surface of the smoke curing device main body 1 form a closed space to accommodate discharged smoke; the pumping device 3 is turned on; wood chips of smoke curing wood such as "hickory, mesquite, applewood, and cherry" are put into the burning part 21 for burning, so as to produce smoke; the smoke enters the mounting part 22 from the burning part 21 under the action of the pumping device 3, then enters the smoke discharging channel 13 through the second smoke discharging port 221, and is finally discharged from the first smoke discharging port 12 into the cup, so as to achieve smoke curing of the beverage. The device is convenient to use and operate. The multifunctional electric smoke curing device of the present disclosure is provided with the pumping device 3, so that the smoke enters the cup under the action of the pumping device 3, thus overcoming the shortcoming that a conventional "wood cover" smoke curing device brings the smoke into the cup by the flame momentum of a flame igniter and causes a large amount of smoke to escape to air.

Figure 9:
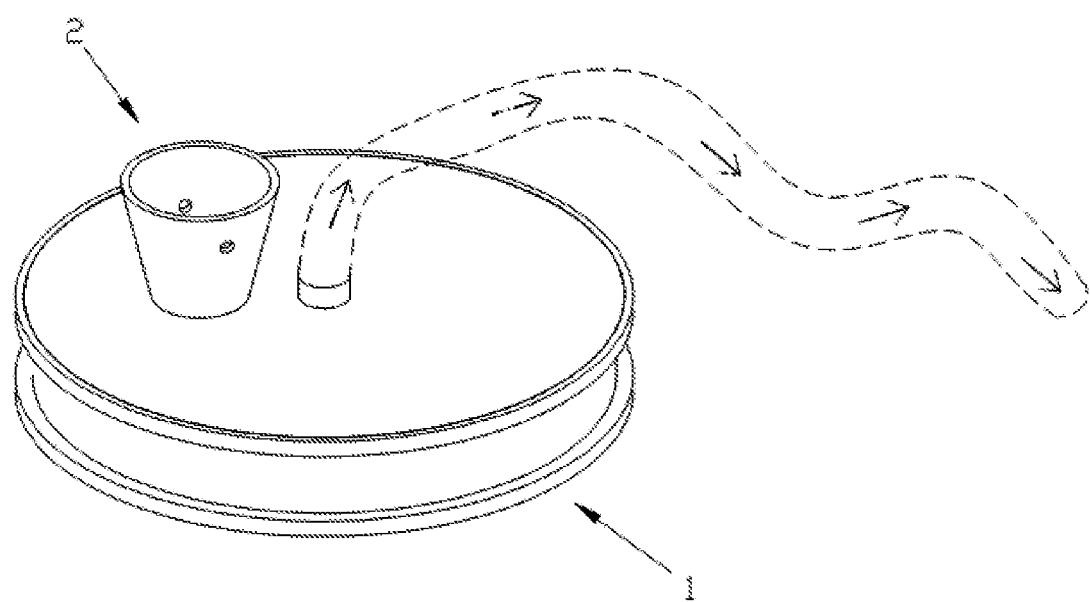
FIG. 9 illustrates a use state diagram when the present disclosure performs smoke curing on non-beverage in combination with a smoke guide hose (the arrow in the drawing is a smoke direction).

During smoke curing of non-beverage, as shown in FIG. 9, a food is placed in a dish and is covered with a transparent cover; the smoke curing device main body 1 is flipped to make the first smoke discharging port 12 upward; the mounting part 22 is then inserted into the lower mounting port 112, so as to mount the burning seat 2 on a back surface of the smoke curing device main body 1; at this time, the opening of the burning part 21 and the first smoke discharging port 12 are both upward; during use, the smoke guide hose is connected to the first smoke discharging port 12; the pumping device 3 is turned on; the wood chips of the smoke curing wood are placed in the burning part 21 for burning to produce smoke; the smoke enters the mounting part 22 from the burning part 21 under the action of the pumping device 3, then passes through the second smoke discharging port 221, the smoke discharging channel 13, and the first smoke discharging port 12, and is finally discharged from the smoke guide hose; the transparent cover is finally opened, and the discharged smoke is guided into the cover, thus achieving smoke curing of the food. The device is convenient to use and operate.

As a preference, the second smoke discharging port 221 is a square elongated slot.

The burning seat 2 further includes a filter net 23, and the filter net 23 is arranged in the burning part 21. During use, the wood chips are placed on the filter net 23 for burning to prevent tiny wood chips from falling off. As a preference, the filter net 23 is made of stainless steel. Preferably, in order to prevent the wood chips from falling off and keep good ventilation, the "mesh size" of the filter net 23 is 2 mm, and the "mesh number" is 85. It should be noted that the above technical features of "mesh size" and "mesh number" are not intended to limit the filter net 23 of the present disclosure. The "mesh size" and "mesh number" of the filter net 23 may also be of other specifications capable of achieving "preventing the wood chips from falling off and keeping good ventilation".

Several air inlet holes 211 are formed in a side wall of the burning part 21. Specifically, in this embodiment, two air inlet holes 211 are formed in two sides of the burning part 21. In the burning process of the wood chips, air enters the burning part 21 via the air inlet holes 211, so that the wood chips are burnt more fully and quickly to produce more smoke.

The mounting part 22 and the mounting channel 11 are both cylindrical; a diameter length of the mounting part 22 is less than an inner diameter length of the mounting channel 11, so as to ensure that a gap is formed between the mounting part 22 and the mounting channel 11, thus avoiding direct contact between the mounting part 22 and the mounting channel 11. When the wood chips are burnt in the burning part 21, since the burning seat 2 is overall made of metal, heat generated by the burning of the wood chips will be conveyed to the mounting part 22 via the burning part 21. Since the gap is formed between the mounting part 22 and the mounting channel 11, a heat isolation space is formed, which prevents the heat from being conveyed from the mounting part 22 to the mounting channel 11; the formed gap can better enable the smoke to be discharged from the second smoke discharging port 221, which prevents blockage of the smoke.

A bottom of the mounting part 22 is provided with a protruding part 222 surrounding one circle of the mounting part 22 and extends outwards; a diameter length of the protruding part 222 is matched with the inner diameter length of the mounting channel 11, so that an outer side wall of the protruding part 222 is clung to an inner side wall of the mounting channel 11, so as to achieve a sealing effect. When the pumping device 3 works, the smoke is discharged via the second smoke discharging port 221. Since the outer side wall of the protruding part 222 is clung to the inner side wall of the mounting channel 11 to form the sealed space, the smoke is prevented from leaking into the air from the bottom of the mounting part 22, and the air can be prevented from entering the mounting part 22 from the other side of the bottom of the mounting part 22, so as to dilute the smoke; a friction force is formed between the clung outer side wall of the protruding part 222 and inner side wall of the mounting channel 11 to play a role of fastening the burning seat 2.

The burning part 21 is of a bowl shape having a large upper part and a small lower part; the smoke curing device main body 1 is cylindrical; a diameter length of the bottom of the burning part 21 is greater than the diameter length of the mounting part 22 and the inner diameter length of the mounting channel 11; when the mounting part 22 is inserted into the mounting channel 11, the bottom of the burning part 21 resists against a surface of a shell of the smoke curing device main body 1 to achieve a fixing effect on the burning seat 2.

An opening in one end of the smoke discharging channel 13 is formed in a side wall of the mounting channel 11, and an opening in the other end of the smoke discharging channel 13 is formed in the bottom end surface of the smoke curing device main body 1 to form the first smoke discharging port 12; when the mounting part 22 is inserted into the mounting channel 11, a passageway for discharging smoke is formed among the second smoke discharging port 221, the smoke discharging channel 13, and the first smoke discharging port 12. As a preference, when the mounting part 22 is inserted into the mounting channel 11, the position of the second smoke discharging port 221 corresponds to the position where the smoke discharging channel 13 is communicated to the opening in one end of the mounting channel 11.

By means of the above structural setting, the smoke is produced by the burning of the wood chips in the burning part 21, and enters the mounting part 22 via the burning part 21; the smoke enters the smoke discharging channel 13 through the opening in the side wall of the mounting channel 11 after being discharged from the second smoke discharging port 221, and is then discharged from the first smoke discharging port 12. That is, "the passageway for discharging the smoke is formed among the second smoke discharging port 221, the smoke discharging channel 13, and the first smoke discharging port 12", so that the position of the second smoke discharging port 221 corresponds to the position where the smoke discharging channel 13 is communicated to the opening in one end of the mounting channel 11, and the smoke can enter the smoke discharging channel 13 more smoothly.

The pumping device 3 includes a driving device 31 and an exhaust fan 32; the exhaust fan 32 is arranged in the smoke discharging channel 13; the driving device 31 is arranged outside the smoke discharging channel 13.

The exhaust fan 32 is provided with an insertion hole; a rotating hole 130 is formed in a side wall, opposite to the insertion hole, of the smoke discharging channel 13; a rotating end of the driving device 31 penetrates into the rotating hole 130 and is connected to the insertion hole. Specifically, the smoke discharging channel 13 includes a left channel 131 and a right channel 132; the left channel 131 and the right channel 132 are both cylindrical; an inner diameter length of the left channel 131 is less than that of the right channel 132; a left opening of the left channel 131 is communicated to the mounting channel 11; a right opening of the left channel 131 is communicated to a left opening of the right channel 132; the right channel 132 is provided with an opening in a lower side wall, and the opening is communicated to the first smoke discharging port 12; the exhaust fan 32 is arranged in the right channel 132; the insertion hole is opposite to a right side wall of the right channel (132); the rotating hole 130 is formed in the right side wall of the right channel 132; a sealing member 133 is arranged at the rotating hole 130.

By means of the above structural setting, when the driving device 31 is turned on, the exhaust fan 32 will be driven to rotate at a high speed to provide a suction force, so that the smoke does a centrifugal motion in the right channel 132 and is then discharged from the first smoke discharging port 12 via a lower opening of the right channel 132. The exhaust fan 32 is arranged in the smoke discharging channel 13; the driving device 31 is arranged outside the smoke discharging channel 13; the sealing member 133 is arranged at the rotating hole 130. By means of the structural setting, no leakage between the smoke discharging channel 13 and the driving device 31 is ensured. When equipment needs to be cleaned, clean water can be directly flushed into the smoke discharging channel 13 for cleaning; the sealing member 133 can effectively prevent the clean water from leaking into the driving device through the rotating hole 130. When the equipment works, the sealing member 133 can effectively prevent the smoke from leaking through the rotating hole 130.

A charging power supply 14 and a control circuit board 15 are arranged in the smoke curing device main body 1; a power button and a charging insertion slot are arranged on the smoke curing device main body 1; the power button and the charging insertion slot are electrically connected to the control circuit board 15, respectively; the charging power supply 14 is electrically connected to the control circuit board 15 and the driving device 31.

By means of the above structural setting, before use, the charging power supply 14 is charged by the charging insertion slot; after the charging is completed, the switch is turned on through the power button to turn on the driving device 31, thus driving the exhaust fan 32 to rotate, so as to provide a suction force.

Finally, it should be noted that above embodiments are merely used for illustrating the technical solutions of the disclosure, rather than limiting the disclosure; though the disclosure is illustrated in detail with reference to the aforementioned embodiments, it should be understood by those of ordinary skill in the art that modifications may still be made on the technical solutions disclosed in the aforementioned respective embodiments, or equivalent substitutions may be made to a part of technical features thereof; and these modifications or substitutions do not make the essence of the corresponding technical solutions depart from the spirit and scope of the technical solutions of the respective embodiments of the disclosure.

What is claimed is:

1. A multifunctional electric smoke curing device, comprising
   a smoke curing device main body; and
   a burning seat, wherein the burning seat is used for burning a combustible to produce smoke; a bottom of the burning seat is provided with a mounting part, and the mounting part has a second smoke discharging port;
   the smoke curing device main body is provided with a mounting channel and a smoke discharging channel; the mounting channel forms an upper mounting opening and a lower mounting opening on a top end surface and a bottom end surface of the smoke curing device main body, respectively;
   the mounting part is detachably arranged in the mounting channel through the upper mounting opening or the lower mounting opening to cause the second smoke discharging port to be communicated with the smoke discharging channel; the smoke discharging channel forms a first smoke discharging port on the bottom end surface of the smoke curing device main body; a pumping device is arranged in the smoke discharging channel to pump out smoke produced by the burning seat via the first smoke discharging port;
   wherein the mounting channel penetrates through the smoke curing device main body up and down, so as to form the upper mounting opening and the lower mounting opening on the top end surface and the bottom end surface of the smoke curing device main body, respectively.

2. The multifunctional electric smoke curing device according to claim 1, wherein the mounting part is internally hollowed; the second smoke discharging port is arranged in the periphery of a side wall of the mounting part; the burning seat further comprises a burning part; the burning part is arranged above the mounting part and is communicated with the mounting part; the burning part is used for accommodating the combustible.

3. The multifunctional electric smoke curing device according to claim 2, wherein the second smoke discharging port is a square elongated slot.

4. The multifunctional electric smoke curing device according to claim 3, wherein the burning seat further comprises a filter net; the filter net is arranged in the burning part.

5. The multifunctional electric smoke curing device according to any one of claims 2 to 4, wherein several air inlet holes are formed in a side wall of the burning part.

6. The multifunctional electric smoke curing device according to claim 5, wherein the mounting part and the mounting channel are both cylindrical; a diameter length of the mounting part is less than an inner diameter length of the mounting channel.

7. The multifunctional electric smoke curing device according to claim 6, wherein a bottom of the mounting part is provided with a protruding part surrounding one circle of the mounting part and extends outwards; a diameter length of the protruding part is matched with the inner diameter length of the mounting channel, so that an outer side wall of the protruding part is clung to an inner side wall of the mounting channel.

8. The multifunctional electric smoke curing device according to claim 7, wherein the burning part is of a bowl shape having a large upper part and a small lower part; a diameter length of the bottom of the burning part is greater than the inner diameter length of the mounting channel; the mounting part is inserted into the mounting channel until the bottom of the burning part resists against the bottom end surface or the top end surface of the smoke curing device main body.

9. The multifunctional electric smoke curing device according to claim 8, wherein an opening in one end of the smoke discharging channel is formed in a side wall of the mounting channel, and an opening in the other end of the smoke discharging channel is formed in the bottom end surface of the smoke curing device main body to form the first smoke discharging port; when the mounting part is inserted into the mounting channel, a passageway for discharging smoke is formed among the second smoke discharging port, the smoke discharging channel, and the first smoke discharging port.

10. The multifunctional electric smoke curing device according to claim 9, wherein when the mounting part is inserted into the mounting channel, the position of the second smoke discharging port corresponds to the position where the smoke discharging channel is communicated to the opening in one end of the mounting channel.

11. The multifunctional electric smoke curing device according to claim 10, wherein the pumping device comprises a driving device and an exhaust fan; the exhaust fan is arranged in the smoke discharging channel; the driving device is arranged outside the smoke discharging channel.

12. The multifunctional electric smoke curing device according to claim 11, wherein the exhaust fan is provided with an insertion hole; a rotating hole is formed in a side wall, opposite to the insertion hole, of the smoke discharging channel; a rotating end of the driving device penetrates into the rotating hole and is connected to the insertion hole.

13. The multifunctional electric smoke curing device according to claim 12, wherein the smoke discharging channel comprises a left channel and a right channel; the left channel and the right channel are both cylindrical; an inner diameter length of the left channel is less than that of the right channel; a left opening of the left channel is communicated to the mounting channel; a right opening of the left channel is communicated to a left opening of the right channel; the right channel is provided with an opening in a lower side wall, and the opening is communicated to the first smoke discharging port; the exhaust fan is arranged in the right channel; the insertion hole is opposite to a right side wall of the right channel.

14. The multifunctional electric smoke curing device according to claim 13, wherein a sealing member is arranged at the rotating hole.

15. The multifunctional electric smoke curing device according to claim 14, wherein a charging power supply and a control circuit board are arranged in the smoke curing device main body; a power button and a charging insertion slot are arranged on the smoke curing device main body; the power button and the charging insertion slot are electrically connected to the control circuit board, respectively; the charging power supply is electrically connected to the control circuit board and the driving device.

16. The multifunctional electric smoke curing device according to claim 15, further comprising a smoke guide hose sleeved at the first smoke discharging port.

\* \* \* \* \*